United States Patent [19]

Scourtes

[11] Patent Number: 4,635,472
[45] Date of Patent: Jan. 13, 1987

[54] CHASSIS DYNAMOMETER CONSTRUCTION

[75] Inventor: George Scourtes, Plymouth, Mich.

[73] Assignee: The Allen Group Inc., Saginaw, Mich.

[21] Appl. No.: 650,257

[22] Filed: Sep. 13, 1984

[51] Int. Cl.⁴ ............................................ G01M 15/00
[52] U.S. Cl. ..................................................... 73/117
[58] Field of Search ............. 73/117, 123, 126, 862.19

[56] References Cited

U.S. PATENT DOCUMENTS 4,077,255  3/1978  Murakami .............................. 73/117

FOREIGN PATENT DOCUMENTS 125640  10/1981  Japan ..................................... 73/117

Primary Examiner—Jerry W. Myracle
Attorney, Agent, or Firm—Learman & McCulloch

[57] ABSTRACT

A chassis dynamometer has a number of rotary units corresponding to the number of wheels of a vehicle to be tested, each of the rotary units constituting a synchronous electric motor independent of one another. Each motor is coupled to an electric power source via a single frequency control unit which is operable to adjust the frequency of electric current supplied to the motors. All motors operate at a uniform speed and each motor is coupled to a torque responsive load cell operable to generate a signal in response to a change in torque of the associated motor. Each load cell is coupled to a summing circuit unit which also is coupled to the frequency control unit for adjusting the latter in accordance with an average of changes in the torque.

21 Claims, 4 Drawing Figures

CHASSIS DYNAMOMETER CONSTRUCTION

This invention relates to a chassis dynamometer of the kind adapted to test motor vehicles under simulated road conditions.

BACKGROUND OF THE INVENTION

It is common practice to subject a motor vehicle to test procedures utilizing a chassis dynamometer which is capable of simulating, to some extent, actual road conditions to which a vehicle is subjected in operation. Chassis dynamometers currently in use have energy absorbing rollers capable of being driven by the driving wheels of a vehicle to simulate the driving of the vehicle over a road. Some dynamometers also are capable of driving both the driving and non-driving wheels of a vehicle, thereby simulating a coasting vehicle.

Among the currently available chassis dynamometers are direct current and alternating current regenerative drive/absorbers. These kinds of dynamometers permit the widest range of actual conditions to be simulated and, in addition, are capable of converting mechanical energy into electrical energy for dissipation through a utility's power lines.

Conventional chassis dynamometers include a rotary drum for each driving wheel of a vehicle. For example, a dynamometer for testing two-wheel drive vehicles has a pair of drums, a four-wheel drive vehicle has two pairs of drums, and a six-wheel drive vehicle has three pairs of drums. Conventionally, the drums of each pair are coupled to one another for conjoint rotation so as to avoid excessive differential rotation between the wheels of a vehicle under test, inasmuch as such differential rotation could cause damage to the vehicle's driving axles or transmission.

One of the major problems associated with a chassis dynamometer wherein the wheel engaging drums are coupled together is that the torque associated with coupled drums is the same regardless of which drum is driven, thereby making it impossible to measure differences between the propulsion forces and the braking forces generated by individual wheels. Thus, chassis dynamometers currently in use cannot reproduce actual field conditions.

SUMMARY OF THE INVENTION

A chassis dynamometer constructed in accordance with the invention is capable of high fidelity simulation of actual conditions encountered by a vehicle as it is driven over a road surface and comprises a plurality of rotary drums some of which are adapted for drive transmitting engagement with the ground-engageable, driving wheels of a vehicle and the remainder of which are adapted for drive transmitting engagement with the other wheels of the same vehicle. In some cases the driving wheels also will constitute the steerable wheels, whereas in other cases the driving wheels and the steerable wheels will be different. In some cases all of a vehicle's wheels will be driving wheels. In any event, a chassis dynamometer constructed in accordance with the invention has sufficient rotary drums to accommodate all of the wheels of a vehicle to be tested.

Each rotary drum of a chassis dynamometer according to the invention is constructed as an integral part of a synchronous electric motor and thus may be referred to as a motor/roller load testing unit. The rotary drum of each testing unit is journaled on a shaft and supports an inductive stator that is concentric with the drum and lies between the latter and the shaft. The shaft is journaled at its opposite ends on a rigid base, but is restrained against rotation by means of a reaction torque arm secured to the shaft and anchored to a fixed structure via a strut incorporating a bi-directional load cell or transducer which is operable to generate an electrical pulse in response to a change in its loading. Each of the motor/roller load testing units is independent of the others in the sense that none of the motor shafts is coupled to any other shaft.

Each of the load testing units is coupled electrically to a single control unit which is operable to vary the frequency of the AC energy supplied to each of the motor armatures in a manner to effect conjoint rotation of all drums at the same speed and in the same direction. Each load cell is electrically coupled to the frequency control unit and is capable of transmitting to the latter a signal proportional to the average of the torque changes sensed by the load cells so as to vary the frequency of the energy supplied to the motor armatures and thereby maintain the speed of rotation of all rollers uniform, even though there may be differences in the torque associated with each motor shaft. Each load cell also is coupled to an indicator which indicates the torque associated with each motor shaft, thereby enabling an operator of the dynamometer to detect variations in energy levels among the several wheels of the vehicle.

The ability of all drums of the dynamometer to rotate at the identical speed, at all times, not only enables the load testing units faithfully to simulate the surface of a road over which the vehicle under test is driven, but also precludes the imposition of unequal forces on any part of the vehicle via its wheels, thereby avoiding the possibility of damaging the vehicle's drive train. The continuously uniform rate of speed of the drums also enables the effectiveness of the brakes associated with each wheel to be tested individually.

THE DRAWINGS

Apparatus constructed in accordance with a preferred embodiment of the invention is disclosed in the following description and in the accompanying drawings, wherein.

THE PREFERRED EMBODIMENT

Figure 1:
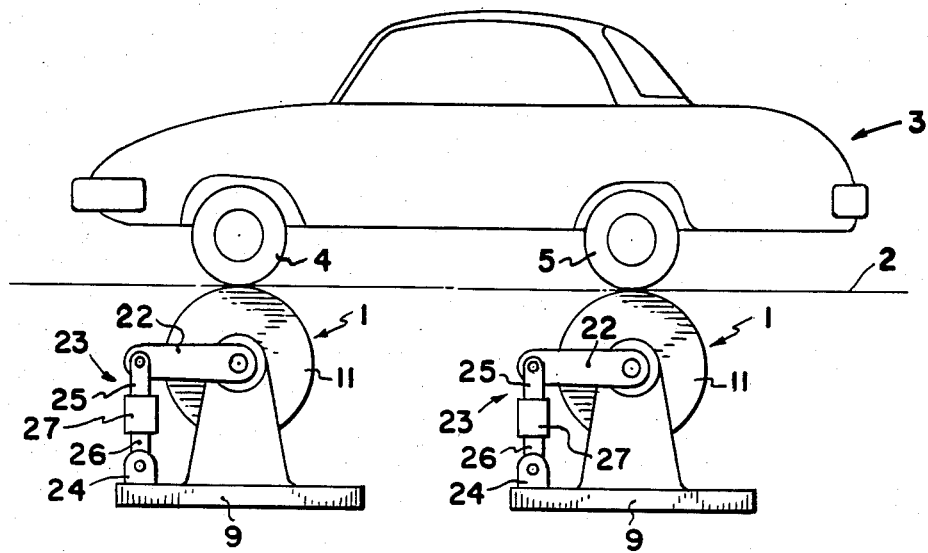
FIG. 1 is a diagrammatic, side elevational view of a chassis dynamometer adapted to test a two-wheel or four-wheel drive vehicle.
Figure 2:
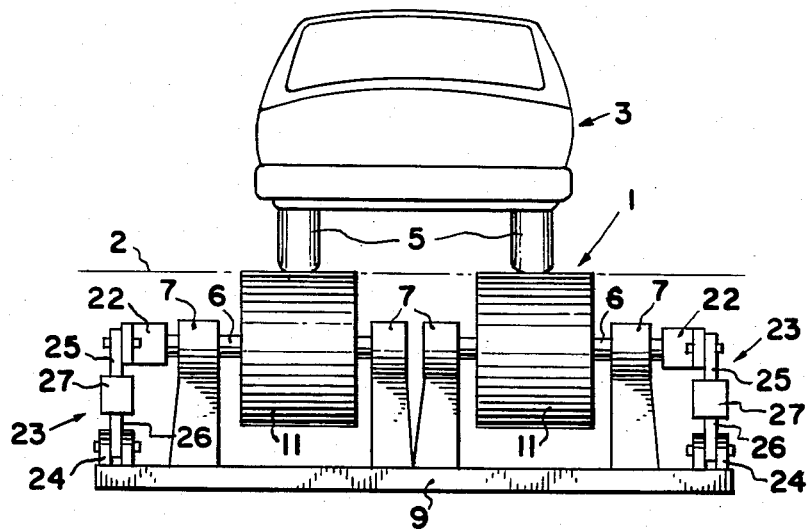
FIG. 2 is an end elevational view of the apparatus shown in FIG. 1.

A chassis dynamometer constructed in accordance with the preferred embodiment of the invention comprises a number of motor/roller load testing units 1 all of which are alike and each of which is mounted in a pit or chamber lying below a load supporting surface 2 over which a vehicle 3 may be driven. The vehicle shown has four ground engageable wheels comprising two steerable front wheels 4 and two rear wheels 5. For purposes of illustration either the front wheels or the rear wheels may be the driving or propulsion wheels, or all four wheels could be the driving wheels. For a typical four-wheel vehicle, regardless of whether it is equipped with a two- or four-wheel drive transmission, there should be one motor/roller unit for each wheel. The motor/roller units are so arranged as to correspond to the front-to-rear and the side-to-side spacing of the wheels 4 and 5, thereby enabling all four wheels to be in drive transmitting engagement with the respective units 1 simultaneously.

Preferably, the surface 2 has openings therein through which the motor/roller units project, and suitable stabilizing rolls or the like (not shown) are provided to ensure stability of the vehicle on the motor/-roller units, as is conventional.

Figure 3:
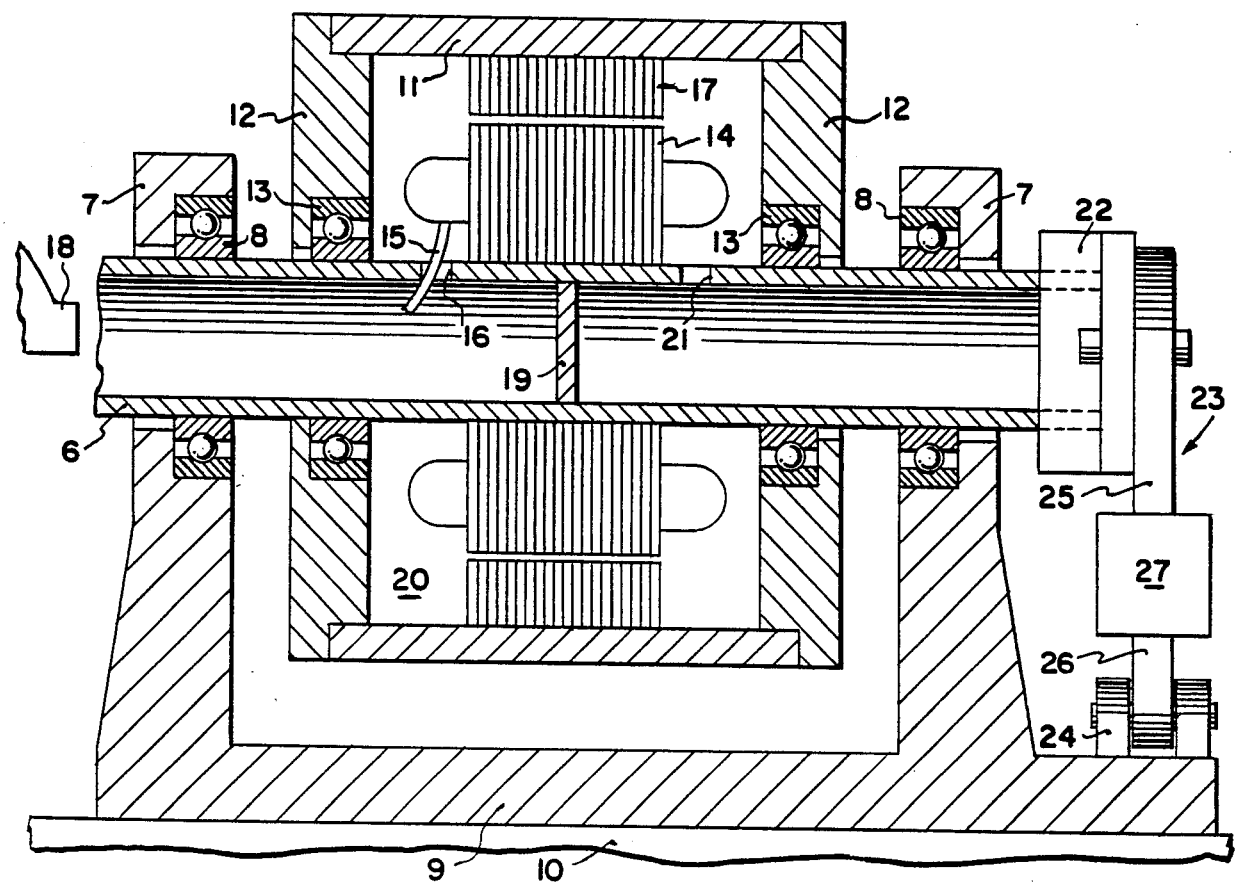
FIG. 3 is an enlarged sectional view through one of the load testing units.

As is best shown in FIG. 3, each load testing unit 1 comprises a hollow armature shaft 6 independent of all the other shafts and journaled at its opposite ends in stationary supports 7 by means of bearings 8. The supports 7 extend upwardly from a base 9 which is fixed to a suitable floor 10 below the surface 2. Encircling each shaft 6 is an annular drum 11 having end walls 12 provided with bearings 13 for journaling the drum on the shaft 6. A stationary armature 14 is fixed on the shaft 6 and has its winding connected to a suitable AC power source by electrically conductive lines 15 which extend through an opening 16 in the shaft 6. On the inner surface of each drum 11, and between the latter and the armature 14, is an inductive stator 17 which is fixed to the drum so as to be rotatable therewith.

Each shaft 6 is in communication at one end thereof with a blower 18 which delivers cooling air to the interior of the hollow shaft 6. A baffle 19 in the shaft diverts the cooling air via the opening 16 into a chamber 20 formed by the drum 11 and its end walls. A second opening 21 is provided in the shaft 6 on the downstream side of the baffle 19 and through which air from the member 20 may be discharged toward the opposite end of the shaft.

In the disclosed embodiment of the invention each shaft 6 is freely rotatable relatively to its supports 7 and each drum 11 is freely rotatable relatively to the associated shaft 6. To limit or restrict rotation of each shaft 6 there is fixed to the latter a torque arm 22 which projects radially and is pivoted to one end of a strut 23, the opposite end of which is pivoted to an anchor 24 fixed on the base 9. Each strut incorporates a pair of relatively movable links 25 and 26 having corresponding ends connected to a bi-directional torque sensing load cell or transducer 27 of known construction which is operable to generate an electrical signal in response to a change in torque associated with the shaft 6.

Figure 4:
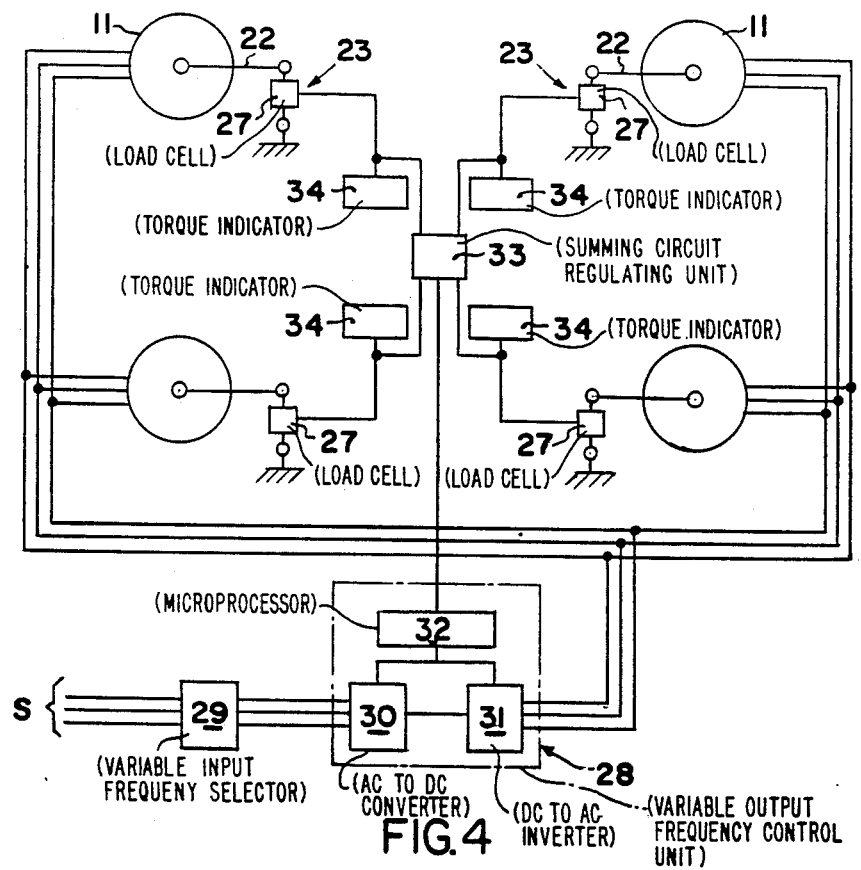
FIG. 4 is a simplified, schematic diagram of the circuitry associated with the dynamometer.

The circuitry of a dynamometer constructed in accordance with the invention is regenerative and is disclosed in FIG. 4 as being adapted for use with a 3-phase, 230/460 volt, 60 Hz alternating current energy source S. The armature 14 of each motor/roller assembly 1 is connected to the source via a variable output frequency control unit 28 and a manually or computer controlled variable input frequency selector 29 of known construction. The variable output frequency control unit 28 may be any one of a number of thyristor drive control systems, one of which is manufactured by Westinghouse Electric Corporation under the trademark VARI-CHRON. The control unit 28 includes an AC to DC converter 30 coupled to the frequency selector 29. The converter 30 converts the alternating current to direct current. The converter 30 is connected to a DC to AC inverter 31 having a variable frequency output in circuit with the armatures of all of the motor/roller assemblies.

A microprocessor 32 forming part of the control unit 28 interconnects the latter with a conventional summing circuit regulating unit 33 which is connected to each of the load cells 27. The unit 33 thus is capable of receiving from each of the load cells 27 signals generated in response to changes in torque imposed on the shaft 6 of the associated motor/roller assembly. The unit 33 averages such signals and transmits a signal proportional to the average to the microprocessor 32 which, in turn, acts on the converter 30 and the inverter 31 to vary the frequency output of the inverter so that all of the drums 11 of the motor/roller assemblies rotate at a uniform speed, regardless of the torque associated therewith. Each of the load cells 27 also is connected to an indicator 34 which is operable to indicate the torque applied on the respective torque arms 22.

Each indicator 34 may be a visually readable device, or it may be one that is coupled to a recorder or other mechanism that is operable to indicate the torque applied to the associated load cell.

Inasmuch as the drums of the several load testing units always rotate at a uniform speed, the wheels of a vehicle under test will rotate at a uniform speed, thereby faithfully duplicating the effect of driving the vehicle along a road. However, should there be any differences between the torque associated with any motor/roller shaft 6, such difference will be indicated by the associated indicator 34, thereby alerting the dynamometer operator to the existence of an actual or potential defect in the vehicle under test.

A chassis dynamometer constructed according to the invention not only can be used to absorb energy developed by driving of the vehicle's propulsion units, but it also can be used to drive the vehicle's wheels. The dynamometer therefore can be used to simulate coasting of a vehicle, and it also can be used to test simultaneously the brakes associated with all of the wheels that are in driving relationship with the load testing units.

When any drum of the testing units 1 is driven by the vehicle's propulsion system, the energy is dissipated to the non-driven drums and/or to the power supply system to ensure that all of the drums are driven at the same speed.

The disclosed embodiment is representative of a preferred form of the invention, but is intended to be illustrative rather than definitive thereof. The invention is defined in the claims.

I claim:

1. A dynamometer construction for use in testing a vehicle having a plurality of spaced ground engaging propulsion devices, said construction comprising a plurality of synchronous, rotary load testing units corresponding in number and spacing to the number and spacing of said propulsion devices; means mounting said load testing units in such positions that one of said units is engageable with a different propulsion device for rotation therewith; adjustable control means for coupling each of said units to a common source of power and selecting a uniform speed at which all of said units rotate; and torque sensing means coupled to each of said units for sensing torque developed thereby.

2. A construction according to claim 1 wherein the mounting means for each of said units is independent of the mounting means for the remaining units.

3. A construction according to claim 1 wherein each of said units comprises a synchronous motor.

4. A construction according to claim 3 wherein each of said motors has an external drum journaled on a shaft for rotation, a stator carried by said drum, and an armature winding carried by said shaft.

5. A construction according to claim 4 wherein each of said torque sensing means is connected to and restrains rotation of the associated shaft.

6. A construction according to claim 1 including at least two of said load testing units.

7. A construction according to claim 1 including at least four of said load testing units.

8. A construction according to claim 1 wherein each of said load testing units comprises a synchronous motor having a drum journalled on a hollow shaft, a stator fixed to said drum internally of the latter; an armature fixed to said shaft between the latter and said stator, said shaft having at least one opening therein in communication with the interior of said drum; and means for delivering cooling fluid into said drum via said opening.

9. A construction according to claim 1 wherein each of said load testing units includes a regenerative synchronous motor.

10. A dynamometer construction for use in testing a vehicle having a plurality of ground engageable wheels at least some of which are propulsion wheels, and the remainder of which are steerable wheels, said construction comprising a plurality of drums corresponding at least to the number of driving wheels and so arranged that each of said drums may engage a separate one of said driving wheels; a plurality of synchronous motors corresponding to the number of said drums and drivingly coupled thereto; single control means for electrically coupling each of said motors to a source of electrical power and being operable to control the speed of all of said motors; torque sensing means connected to each of said motors for sensing the torque associated therewith; regulating means electrically interconnecting said control means and each of said sensing means for adjusting said control means in response to a change in torque sensed by any of said sensing means to maintain uniform the speed of all of said motors; and means for indicating the torque sensed by each of said sensing means.

11. A construction according to claim 10 wherein said steerable wheels also are the propulsion wheels.

12. A construction according to claim 10 wherein said steerable wheels are in addition to the propulsion wheels.

13. A construction according to claim 10 wherein there are at least two of said drums.

14. A construction according to claim 10 wherein there are at least four of said drums.

15. A construction according to claim 10 wherein each of said drums carries a stator constituting a part of the associated synchronous motor and wherein each of said motors has a shaft concentric with said drum carrying an armature radially inward of said stator.

16. A construction according to claim 15 wherein each of said torque sensing means includes an arm fixed to the associated shaft and restraining rotation thereof.

17. A construction according to claim 16 wherein said torque sensing means includes a bi-directional load cell connected to said arm.

18. A chassis dynamometer for use in testing a vehicle having a plurality of ground engageable wheels at least some of which are propulsion wheels, said dynamometer comprising a number of rotary drums; means mounting each of said drums for rotation about an axis independently of any other of said drums and in such position as to be in drive transmitting engagement with one of said propulsion wheels; a plurality of motors corresponding to the number of said drums and drivingly coupled thereto; adjustable, electrical control means; means for connecting said control means to a source of electrical power; means coupling said control means to each of said driving motors for driving all of said motors at uniform rate of speed; torque sensor means coupled to each of said motors for sensing a change in the torque associated therewith and generating a signal proportional to such change; and regulating means interconnecting all of said torque sensor means with said control means for transmitting to the latter signals generated by said sensor means, said regulating means being operable in response to the sensing by any of said torque means of a change in torque to adjust said control means and maintain uniform speed of said motors.

19. A dynamometer according to claim 18 wherein each of said motors is a synchronous induction motor.

20. A dynamometer according to claim 18 wherein each of said drums carries a rotary stator and encircles an armature carried by a shaft concentric with said drum, and including means restraining said shaft against rotation.

21. A dynamometer according to claim 20 wherein said restraining means comprises a torque arm fixed to said shaft and a strut connecting said arm to an anchor, said torque sensor means constituting part of said strut.

* * * * *